United States Patent [19]

Gabriele

[11] 4,220,530

[45] Sep. 2, 1980

[54] FISH TANK FILTER

[76] Inventor: Raymond S. Gabriele, 1715 N. Long Ave., Chicago, Ill. 60639

[21] Appl. No.: 42,813

[22] Filed: May 29, 1979

[51] Int. Cl.$^2$ .................... B01D 35/14; E04H 93/20
[52] U.S. Cl. ..................................... 210/86; 210/169
[58] Field of Search ................. 210/169, 104, 129, 86; 119/3, 5

[56] References Cited

U.S. PATENT DOCUMENTS

| | | | |
|---|---|---|---|
| 2,653,908 | 9/1953 | Radda | 210/169 |
| 3,152,987 | 10/1964 | Gare | 210/169 |
| 3,633,749 | 1/1972 | Panosh | 210/169 |
| 3,669,297 | 1/1972 | Willinger | 210/169 |
| 3,720,317 | 3/1975 | Willinger | 210/169 |
| 3,746,168 | 7/1973 | Willinger et al. | 210/169 |
| 3,848,567 | 11/1974 | Garber, Jr. | 210/169 |
| 3,892,663 | 7/1975 | Wiedenmann | 210/169 |
| 3,946,753 | 3/1976 | Tischler | 210/104 |
| 4,067,809 | 1/1978 | Kato | 210/169 |

*Primary Examiner*—Theodore A. Granger
*Attorney, Agent, or Firm*—John J. Kowalik

[57] ABSTRACT

A fish tank filter having a maze-like passageway with filtering medium therein through which waste water from the fish tank is passed, and a clogging indicator associated with the passageway for signalling the filtering condition of the medium.

3 Claims, 5 Drawing Figures

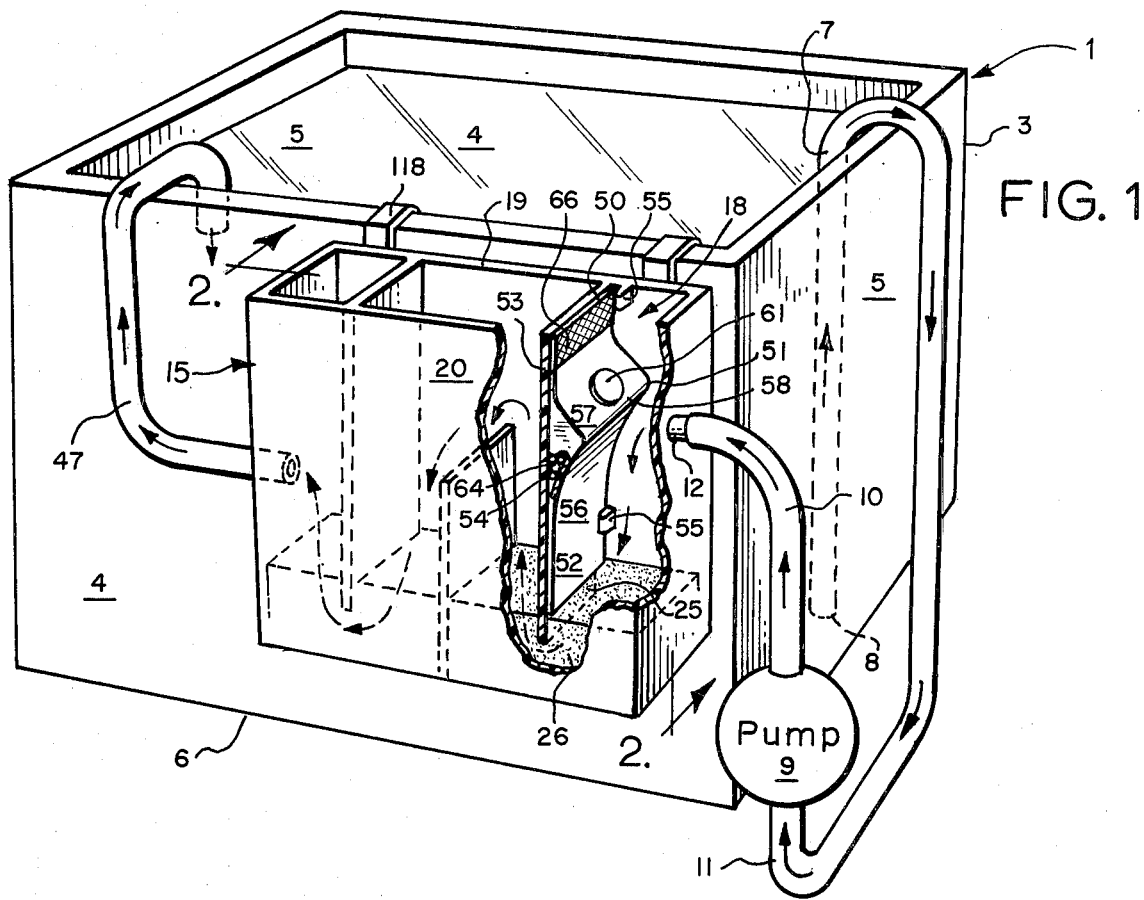
FIG. 1
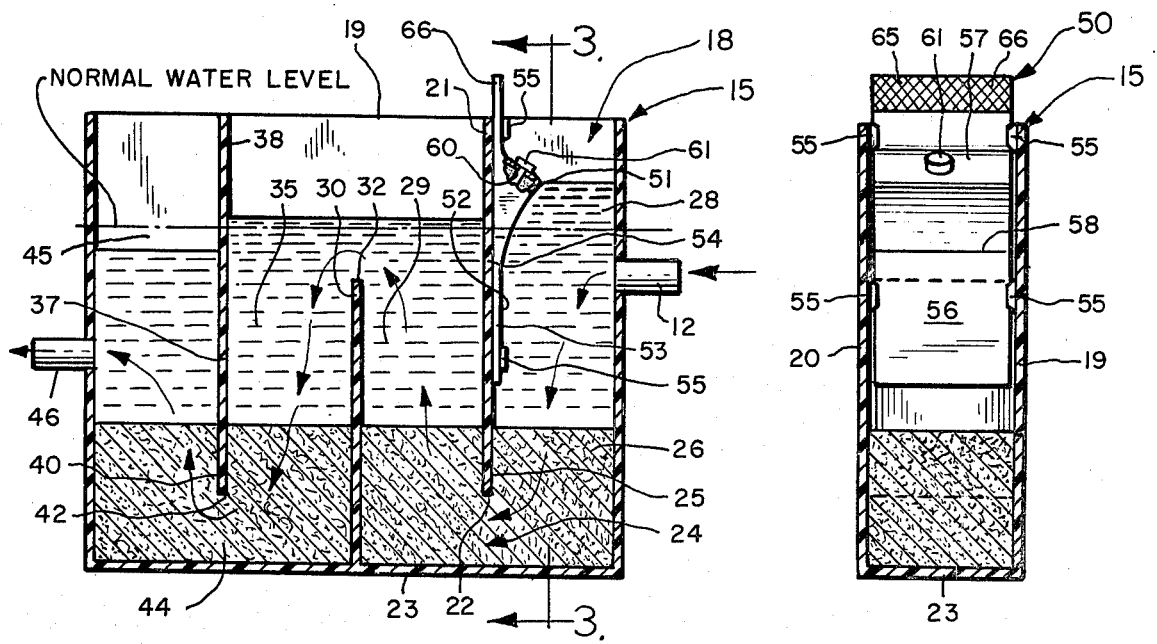
FIG. 2
FIG. 3

FISH TANK FILTER

DISCUSSION OF THE INVENTION

This invention relates to fish tank filters and more specifically to a novel arrangement of baffles in the filter with a filtering medium to provide a simple and effective filter in combination with indicia for signaling that the filtering medium is expended or clogged and requires replacement.

DISCUSSION OF THE PRIOR ART

Various types of filtering devices for fish tanks are known. These in general utilize what is known in the trade as "angel hair," which are thin stands of glass. Also charcoal has been used.

SUMMARY OF THE INVENTION

It is an object of this invention to provide a filtering device for aquariums capable of not only removing solid particles from a predetermined volume of water in a filtering tank as it passes through the filtering tank, but also capable of purifying the water. A further object is to provide a filtering device for aquariums simple in structure and allowing of easy removal of parts, assembly without tools, attachment to water tanks of all sizes, and speedy cleaning and replacement of filtering material.

This invention affords a filtering device in which a tank is provided in which a series of laterally spaced vertical baffles subdivide the tank into a plurality of serially arranged chambers through which the unfiltered water courses, there being provided a filtering medium, preferably charcoal, in the bottom of each chamber, the water passing under one baffle, then over another, and then under a third. The water is pumped into an inlet chamber at one end of the tank and discharged from an outlet chamber at the other end, and the hydrostatic pressure and the porosity of the filtering medium determine the level of the water in each chamber.

One object of this invention is to provide a novel indicia which is operative as a function of the level of the water in a particular chamber, said invention in one form comprising an indicator in the form of a vertical stick which is slidably supported from one of the walls of the tank, the stick having a float at its lower end and the upper end, in normal flow conditions through the tank, being disposed at a non-indicating level and in the plugged condition of the filtering medium indicating the same by the indicator rising because of the increase in the level of the water in the chamber.

Another version of the invention utilizes a baffle which is slidable with respect to the wall of the tank in which it is suspended, the baffle being floatable in the water such that when constriction to water flow occurs, the baffle rises due to the rise in the water level in the particular chamber. Depending on the filtering medium used, the indicator can be adjusted to vary its draft by adding or removing weights from the indicator.

The invention provides a continuous circuit with the aquarium and includes a circulating pump having an intake from the aquarium and an outlet to one end of the filtering means, which then operates through hydrostatic pressure to cause the water to seep through the filtering medium in a sinusoidal maze.

These and other objects and advantages inherent in and encompassed by the invention will become more apparent from the specification and the drawings, wherein:

FIG. 1 is a perspective view partly broken away, showing one embodiment of the invention;

FIG. 2 is a longitudinal cross-section taken substantially on line 2—2 of FIG. 1;

FIG. 3 is a transverse cross-section taken substantially on line 3—3 of FIG. 2;

DESCRIPTION OF FIGS. 1–3

Figure 4:
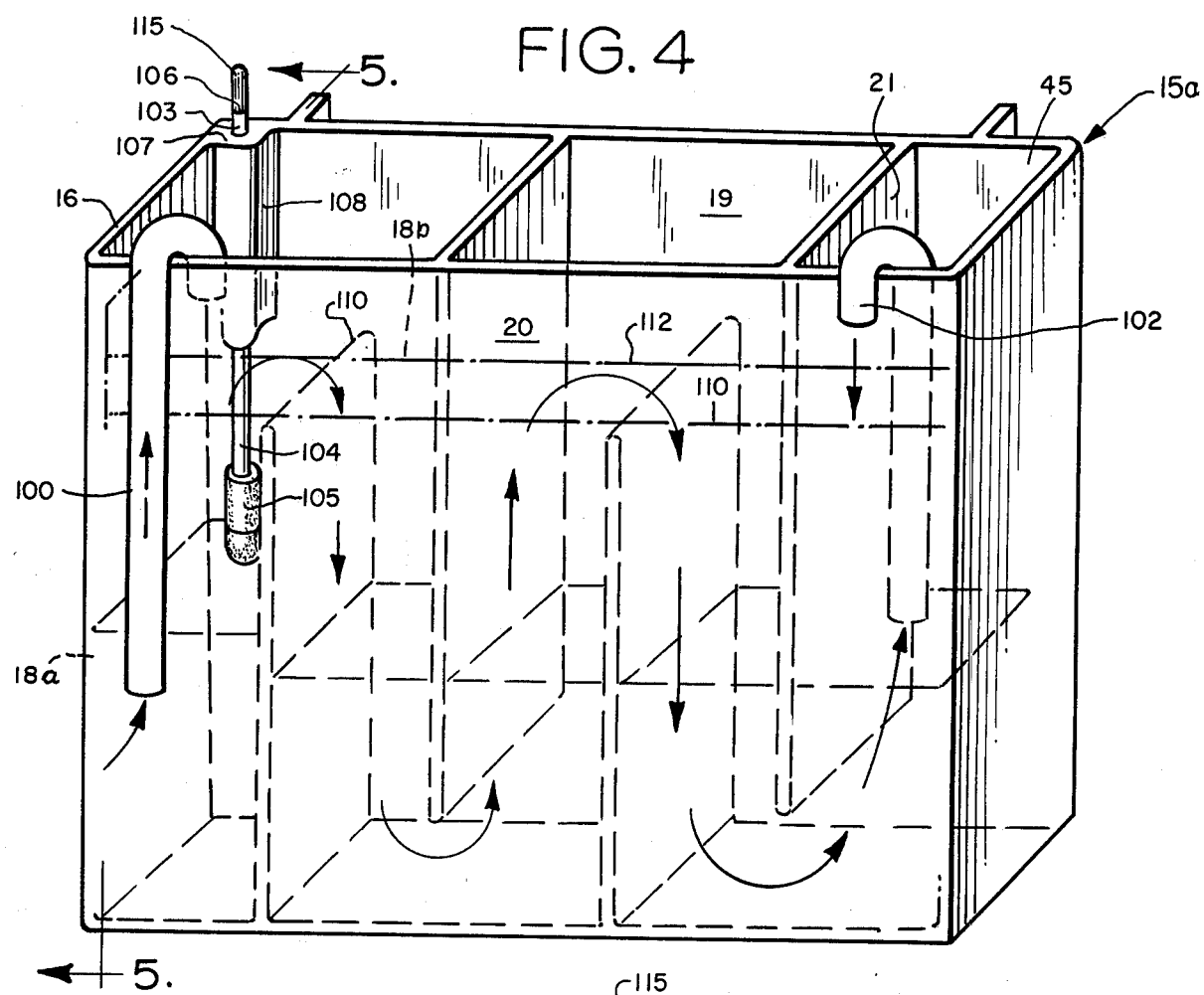
FIG. 4 is a perspective view of another embodiment of the invention.

The invention is shown in connection with an aquarium 1 which may be any conventional tank 3 having side walls 4,4 and walls 5,5 and a bottom 6.

An inlet tube 7 is hooked over one of the walls 5 and has an end 8 extending to adjacent the bottom of tank 3. Tube 7 is connected to the suction side 11 of a pump 9 which has a discharge conduit 10 connected to a nipple 12 forming a passage into the filter generally designated 15. The nipple 12 extends through an end wall 16 of the rectangular filter housing or tank 15 intermediate its upper and lower ends, and discharges the contaminated water into the first chamber 18 which is defined between the side walls 19 and 20 of the housing and a vertical baffle 21 opposing and spaced from end wall 16. The baffle 21 extends at its upper edge even with the upper edges of the housing walls and at its lower edge 22 is vertically spaced from the bottom wall 23 of the housing and with the adjacent portions of the side walls 19 and 20 defines a passageway 24.

The passageway 24 is buried as well as the lower portion 25 of the baffle 21 within a filter material 26 such as charcoal or the like.

The contaminated water indicated 28 flows through the filter material 26 into a second chamber 29, the far side of which is defined by an upright baffle 30 which is connected at its lower edge to the bottom wall 23 and at its lateral edges to the side walls 19 and 20, and terminates in an upper edge 32 at a level approximately midway between the top and bottom of the housing.

The water flows over the top edge 32 into a third chamber 35 which is defined by the baffle 30 and an opposing baffle 37 spaced therefrom lengthwise of the housing. The baffle 37 has its upper edge 38 flush with the upper edge of the tank 15 and at its lateral edges is connected integrally with the interior sides of the side walls 19 and 20 of the housing 15, and at its lower portion 40 is buried within the filter material and terminates in a lower edge 42 which defines with the bottom wall and adjacent portions of side walls 19 and 20 a passageway 44 through which the water seeps into a discharge chamber 45, and then into the outlet nipple 46 in a path indicated diagramatically by the arrows 47. The discharge nipple 46 is located at a preferably lower level than the inlet nipple as best seen in FIG. 2. The nipple 46 is connected by a tube 47 to the aquarium.

A feature of the present invention is a novel sludge indicator 50 which in this embodiment comprises an envelope 51 formed on an obverse side 52 of a slide guide plate 53 which may be a thin plastic strip of rectangular shape in slidable contact on its reverse side 54 with the opposing face 55 of the baffle 21. The guide plate 53 is held in guided engagement with the baffle 21 by guide gibs 55 on walls 19 and 20, whereby the indicator is constrained to up and down movements. The envelope 51 provides a hollow float chamber 54 which includes diagonal walls 56,57 merging into an apex 58 adjacent ends, and at their remote ends are integrally formed with the obverse face 52 of the guide. The upper walls 57 is provided with an opening 60 into which a cork or plug 61 is inserted to make the chamber 54 watertight. As best seen in FIG. 1 the opening 60 provides access to the chamber 54 for loading with float 64 (FIG. 1) which then determines the draft of the indicator.

The indicator normally is in its lowest position, as seen in FIG. 1, when the water level is at a normal elevation as shown at 65 in FIG. 3.

As soon as the filter material becomes packed with the impurities carried from the aquarium, the level of the water in the chambers will start to rise and thus the indicator will also rise, which means that the upper edge portion 66 which may be colored, for example in red, will ascend above the upper edge of the filter housing, indicating that the filter is becoming plugged and requires replacement.

EMBODIMENT OF FIGS. 4 AND 5

Figure 5:
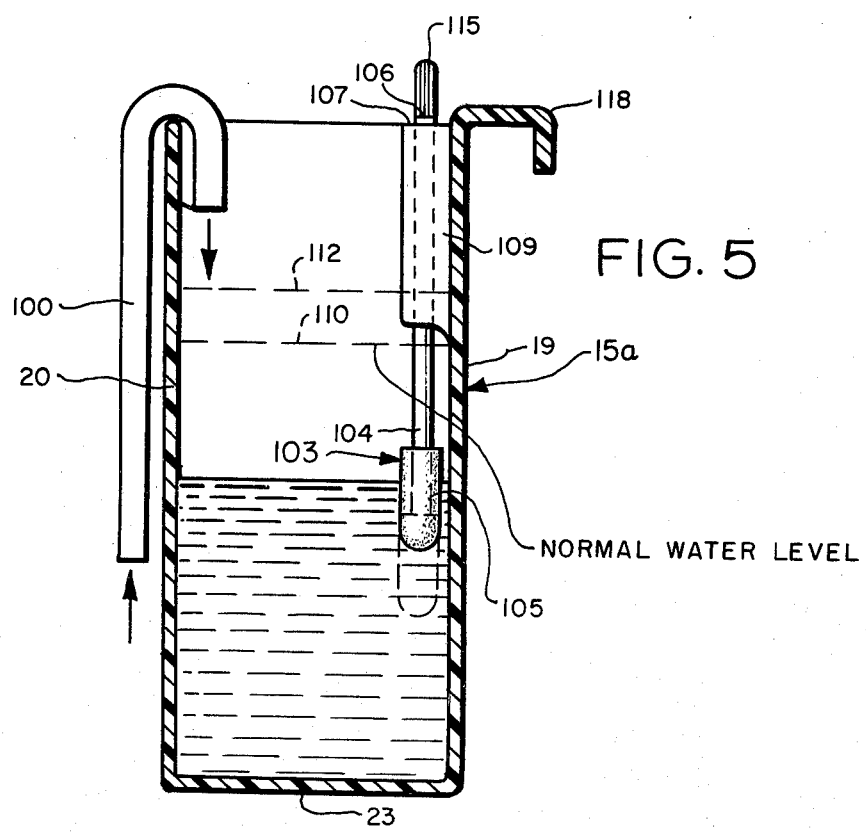
FIG. 5 is a cross-sectional view taken substantially on the line 5—5 of FIG. 4.

In the embodiment of FIGS. 4 and 5, the structure is similar to FIGS. 1-3, and therefore like parts will be designated by the same reference numerals.

In this modification, the inlet tube 100 is hooked over the upper edge of the housing 15a and drains into the upper end of chamber 18a. The outlet chamber 45a is provided with a suction tube 102 which is hooked to the suction side of the pump (not shown), which discharges into the aquarium.

In this embodiment the sludge indicator 103 is in the form of a rod 104 which has float 105 at its lower end adapted to be held in operating position by a stop 106 which is adapted to abut against the upper end as at 107 of a guide 108, through which the rod 104 extends by way of a vertical bore 109. As the filter becomes plugged the water level rises above the dam as indicated at 110 to 112, and the upper indicating end 115 will also rise and thus indicate the sludging condition.

It will be appreciated that the filter housings each are provided with hooks 118 to hook over the edge of a wall of the aquarium.

As best seen in FIG. 4 an additional chamber 18b has been provided in this embodiment.

It will be appreciated that the boyancy of the float 105 has been predetermined to float upon the water level reaching over 110.

I claim:

1. A filtering device, particularly for use in filtering aquarium water comprising:
    a tank having an inlet, outlet and intervening communication chambers;
    filtering means within each chamber in intercepting relation to the flow of contaminants and water from the inlet to the outlet chambers;
    said chambers being defined by baffles arranged to provide a labyrinthian flow path between said chambers;
    a first of said baffles being spaced from the bottom of the tank and a second of said baffles extending from the bottom and terminating short of the top of the tank, whereby the water is caused to flow beneath said first baffles and over the second baffles,
    said chambers having bottom portion and said filtering means filling said bottom portion above the lower ends of the first baffles and below the upper ends of the second baffles;
    indicia means supported in said tank and operative to indicate sludging conditions in said flitering means,
    said indicia means comprising a vertically slidable element mounted within the inlet chamber and having means for adjusting the draft thereof,
    and said element slidably supported against an associated baffle, and means for guiding said element along said associated baffle, and an envelope on said element having means for sealing and opening the same.

2. The invention according to claim 1 and means adapted to be inserted into said envelope for adjusting the draft of said element.

3. The invention according to claim 2 wherein said envelope is a triangular structure having a narrow lower end and a wide upper end portion, and said upper end portion having an access hole therein and sealing means comprising a plug insertable into said opening.

* * * * *